United States Patent [19]

Hill

[11] 3,988,294
[45] Oct. 26, 1976

[54] SURFACE COATING COMPOSITIONS CONTAINING ANTIMICROBIC UREAS

[75] Inventor: Harry Elwyn Hill, Wallingford, Conn.

[73] Assignee: R. T. Vanderbilt Company, Inc., Norwalk, Conn.

[22] Filed: Mar. 2, 1976

[21] Appl. No.: 663,078

Related U.S. Application Data

[63] Continuation-in-part of Ser. No. 449,693, March 11, 1974, abandoned.

[52] U.S. Cl. .................. 260/45.8 N; 106/15 R; 260/293.88; 260/45.9 NC; 424/322
[51] Int. Cl.² ................... C08K 5/34; C08K 5/32; C08K 5/21
[58] Field of Search ............... 260/45.9 NC, 293.88, 260/45.8; 106/15 AF; 424/322

[56] References Cited
UNITED STATES PATENTS

| | | | |
|---|---|---|---|
| 3,061,640 | 10/1962 | Beaver | 260/553 A |
| 3,142,703 | 7/1964 | Strecker | 117/138.5 |
| 3,200,035 | 8/1965 | Martin et al. | 117/138.5 |
| 3,223,547 | 12/1965 | Beridler | 106/316 |
| 3,288,851 | 11/1966 | Martin et al. | 260/553 |
| 3,497,541 | 2/1970 | Martin et al. | 424/322 |
| 3,592,932 | 7/1971 | Duerr et al. | 424/322 |
| 3,689,550 | 9/1972 | Schellenbaum et al. | 260/553 C |
| 3,817,760 | 6/1974 | Brake | 106/15 AF |

*Primary Examiner*—V. P. Hoke
*Attorney, Agent, or Firm*—Roland T. Bryan

[57] ABSTRACT

Surface coating compositions, resistant to deterioration resulting from attack by fungi and other microorganisms, containing antimicrobial compounds of 1-substituted-3-dihalophenylurea compounds of the structural formula:

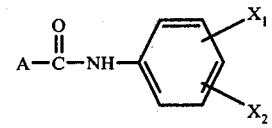

wherein $X_1$ and $X_2$ respectively represent halogens having an atomic number from 9 to 35 and A is an amino radical selected from the group consisting of dialkylamino having 1 to 3 carbon atoms in each alkyl group; (3-dibutylaminopropyl)amino when $X_1$ and $X_2$ are in the 2,5 position; (3-piperidinopropyl)amino when $X_1$ and $X_2$ are in the 2,3 or 3,4 position and methylmethoxyamino when at least one of $X_1$ and $X_2$ is bromine.

13 Claims, No Drawings

SURFACE COATING COMPOSITIONS CONTAINING ANTIMICROBIC UREAS

BACKGROUND OF THE INVENTION

This application is a continuation-in-part of Ser. No. 449,693, filed Mar. 11, 1974 now abandoned.

FIELD OF THE INVENTION

This invention relates to surface coating compositions and their protection against attack by microorganisms. More particularly, this invention pertains to fungus-resistant paints and varnishes which contain certain urea derivatives as fungicidally active ingredients.

The deteriorating effect of various fungi on protective and decorative surface coatings, especially exterior paints, has been a continuing problem in numerous environments where the climatic conditions such as humidity and temperature are favorable to the growth of microorganisms.

Mildew fungi have an especially deteriorating effect on organic coatings such as exterior paints based on latex, oil and oil-in-water systems which contain as binders oil, oleoresins and synthetic linear addition polymers or their mixtures. Because such fungal attack causes discoloration, disfigurement and blemish on the surface of the dried paint and ultimately loss of adhesion of the coating to the substrate, mold inhibitors are desirably incorporated into paints, especially those intended for exterior use.

The use of a fungicide as a mold inhibitor is to be distinguished from its use as a can preservative. Additives used only as can preservatives are intended to prevent bacterial deterioration of the liquid paint during storage, in the container, while mold inhibitors are intended to prevent fungal growth on the dried paint film. For this purpose, can preservatives are normally employed at concentrations significantly lower than the concentrations at which mold inhibitors are employed. To be useful as a mold inhibitor, the fungicidal additive desirably meets a number of criteria. The fungicide must be compatible with the paint medium and retain its activity during normal container storage life. Many fungicides lose their fungicidal activity prior to application of the paint as a protective or decorative coating. Loss of activity during storage in the container is of particular concern in the case of latex paint because of its alkalinity and water content. Furthermore, many fungicides decompose in aqueous alkaline systems. In the dried coating, the fungicide must not only retain its activity but also remain in the coating without leaching out or evaporating to the atmosphere. For optimum effectiveness, the fungicide must be uniformly distributed throughout the coating, that is, it must permeate the coating and may not concentrate in any one stratum of the coating. The fungicide should not discolor the coating. This is especially important in the case of light-colored paints. Furthermore, the fungicide should not impart obnoxious odors to the paint.

Therefore, the fact that a particular chemical compound may be known to possess fungicidal activity does not necessarily mean that it will be effective in inhibiting fungal growth on exterior coating surfaces for long periods of time. In fact, most known fungicides are not useful in paint for one or more of the above-mentioned reasons.

Surprisingly, it has been found that certain 3-dihalophenylurea compounds satisfy all of the above criteria and are particularly suitable for combatting fungal degradation and microorganism growth on paint films. In this aspect, their activity is comparable to that of the highly effective mercury type mold inhibitors. However, the compounds of the invention have the added advantage that they possess a lower order of toxicity in comparison with the mercury type compounds and thus, are less detrimental to the environment.

DESCRIPTION OF THE PRIOR ART

Biologically active preparations containing 1-alkyl-3-aryl-ureas as active ingredients are well known in the art. Thus, bactericidal, herbicidal and pesticidal 1-(mono-and dialkyl)-3-phenyl-ureas are disclosed in U.S. Pat. Nos. 2,655,534, 2,704,245 and 2,768,971, 1-(dialkylaminoalkyl)-3-(3,4-dihalophenyl)ureas in U.S. Pat. No. 3,061,640 and 1-methyl-1-methoxy-3-phenylurea in U.S. Pat. No. 3,288,851. Many of these have gained commercial prominence as herbicides.

Paints have been preserved with substituted 1-(2-ethylhexyl)-3-phenylureas as disclosed in U.S. Pat. No. 3,592,932, 1-(mono-and dialkyl)-3-(p-chloroacetylphenyl)ureas in U.S. Pat. No. 3,223,547 and substituted 1-(2-hydroxyphenyl)-3-phenylureas in Swiss Patent No. 506,240. As paint preservatives during storage in the container, such bactericides may not necessarily satisfy the criteria for application as fungicides or mold inhibitors in the dried paint film. Furthermore, the aforementioned patents do not describe longterm aging tests by outdoor exposure necessary for a complete appreciation of the effectiveness of a particular compound for inhibiting fungal growth over the reasonable life of the paint film. Such aging tests are particularly meaningful when carried out under actual environmental conditions normally encountered by exterior paint films.

Therefore, the particular prior art compounds may be considered as specific and unsuggestive of other compounds of the class providing the properties necessary for an efficient long-term mold inhibitor.

SUMMARY OF THE INVENTION

In accordance with this invention, it has been discovered that certan 1-alkyl-3-(dihalophenyl)ureas and 1,1-dialkyl-3-(dihalophenyl)ureas possess long-term antifungal properties against growth of mildew fungi on the surface of protective coatings exposed to the elements. These compounds may be represented by the structural formula:

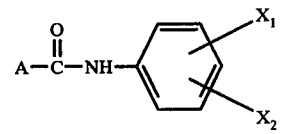

wherein $X_1$ and $X_2$ respectively represent halogens having an atomic number from 9 to 35 and A is an amino radical selected from the group, consisting of dialkylamino having 1 to 3 carbon atoms in each alkyl group; (3-dibutylaminopropyl)amino when $X_1$ and $X_2$ are in the 2,5 position; (3-piperidinopropyl)amino when $X_1$ and $X_2$ are in the 2,3 or 3,4 position and methylmethoxyamino when at least one of $X_1$ and $X_2$ is bromine.

More specifically, it has been discovered that the compounds of the present invention are effective as long-term mold inhibitors in a wide variety of latex and oil-based paints. They are stable in paint formulations and do not constitute a serious discoloration problem. The compounds of the invention remain in the dried coating without evaporation and are not leached out by water. They can be readily incorporated into and dispersed throughout the paint formulation and are relatively nontoxic to humans. These compounds have been found to be particularly effective in aqueous paints.

Therefore, it is an object of this invention to provide mold inhibitors for dried surface coatings which are stable and provide excellent and prolonged resistance to fungi, bacteria and microorganisms without adversely affecting the color, viscosity and other physical properties of the surface coating compositions.

Another object of this invention is to provide a latex or oil-based paint containing 1-(mono-and dialkyl)-3-(dihalophenyl)urea type mold inhibitors.

A further object of the invention is the process of a method to protect surface coatings against mildew growth by incorporating into the coating formulation certain urea derivatives as mold inhibitors.

Other objects and advantages will become apparent from the detailed description which follows.

DESCRIPTION OF THE PREFERRED EMBODIMENTS

The compounds of the present invention can be prepared by reacting a primary or secondary amine with any isocyanate by classical methods as set forth in "Beilstein's Handbuch der Organischen Chemie," Vol. 12, pp. 348–350. Other methods are known also, see for example, U.S. Pat. No. 2,655,534.

The urea derivatives of particular interest are 1,1-(di-lower alkyl)-3-(dihalophenyl)ureas, and, preferably, 1,1-dimethyl-3-(3,4-or 3,5-dichlorophenyl)urea. The urea type fungicides of this invention can be used to impart fungal and bacterial resistance to a wide variety of paints, including both organic solvent-thinned and water-thinned coating systems based upon emulsions, latices or dispersions of synthetic film-forming polymers. The surface coating compositions of this invention exhibit long-term resistance to attack by microorganisms irrespective of whether in solution or applied as a dry coating.

In one preferred embodiment of the invention, the mold inhibitors of the invention are used in an organic solent-thinned system that is based on an oleoresinous binder. Suitable oleoresinous binders include drying or semi-drying oils such as linseed oil, dehydrated castor oil, soya bean oil, oiticica oil, acid esters derived from the drying or semi-drying oils and polyhydric alcohols such as ethylene glycol, glycerol, mannitol, drying or semi-drying oil-modified resins, such as the modified alkyd resins prepared, for example, by the esterification of glycerol, phthalic anhydride and the drying or semi-drying oil fatty acids; the modified phenolic resins prepared, for example, by the reaction of cresols, formaldehyde and the drying or semi-drying oils; the modified esters of rosin or modified rosins prepared, for example, by the esterification of rosin, glycerol or pentaerythritol and the drying or semi-drying oil fatty acids.

In another preferred embodiment of the invention, the urea type mold inhibitors are used in aqueous dispersions or emulsions containing oleoresinous binder as hereinbefore defined and/or a synthetic linear addition binder. Illustrative of the synthetic linear addition polymers that can be used as resinous binder in aqueous dispersions are acrylic resins, butadiene-styrene copolymers, butadiene-acrylonitrile copolymers, polyethylene, polyisobutylene, polystyrene, vinyl polymers such as polyvinyl acetate, polyvinyl butyrate, polyvinyl chloride and their copolymers with other vinyl monomers, acrylonitrile and acrylic acid esters, polyurethanes, epoxies and other conventional film-forming bases.

The antifungal paints may also contain conventional amounts of pigments, which term as used herein includes extenders, fillers and thickeners, such as titanium dioxide, carbon black, calcium carbonate, silica, clay, diatomaceous earth, bentonite, zinc oxide, magnesium silicate, lithopone, mica, mineral or chemical pigment colors, etc. The antifungal paints may also contain the usual amounts of conventional volatile liquids used as thinners or solvents, such as toluene, xylol, turpentine, mineral spirits, water, etc. and, if desired, small amounts of plasticizers, such as tricresyl phosphate; metallic driers, such as metallic salts of carboxylic acids; also other additives, e.g. wetting agents, emulsifying agents, antifoaming agents, coalescing agents, freeze-thaw stabilizers and the like.

The concentration of the mold inhibitor in the paint is not narrowly critical. An effective concentration may range from 0.1 to 5 weight percent based upon the weight of paint or 0.1 to 10 weight percent based upon the weight of the paint solids in the dried coating, a preferred amount is in the range of 0.5 to 2 weight percent based upon the paint solids. The compounds of this invention are incorporated into the paint formulations by conventional techniques similar to those employed in incorporating paint pigments.

The following examples are illustrative of the long-term effectiveness of the compounds of this invention in a wide variety of surface coating compositions. The ingredient materials used in the examples are readily available commercially and the following tradenames and/or trademarks are helpful to identify them: "DAR-VAN", "NYTAL", "RHEOTOL" of the R. T. Vanderbilt Company, Inc.; "Balab" of the Witco Chemical Corp.; "Zopaque" of the Glidden Company; "Triton", "Rhoplex" of the Rohm & Haas Company; "Alinco" of ADM Industrials Oils Corp.; "Exkin" of Tenneco Chemicals; "Bentone" of NL Industries; "Aroplaz" of the Ashland Chemical Company; "Everflex" of the W. R. Grace & Company; "Azo" of the American Zinc Sales Company; "Cellosize" of the Union Carbide Corp.; and "Nopco" of the Diamond Shamrock Corp. In addition, for control purposes, a commercial mold inhibitor "VANCIDE 51Z" (manufactured by R. T. Vanderbilt Company, Inc.) was simultaneously tested with compounds of this invention in example 5. VANCIDE 51Z is a mixture of 87% zinc dimethyldithiocarbamate and 7.5% of zinc 2-mercaptobenzothiazole.

EXAMPLE I

Exterior acrylic latex paint was prepared by blending together the following ingredients in the amounts indicated.

| Exterior Acrylic Latex Paint Formula | | |
|---|---|---|
| High Speed Dispersion | Pounds | Gallons |
| Carboxymethylcellulose (manufactured by Hercules) 2% gel | 116 | 14.0 |
| Water | 117-X* | 14.0 |
| Ethylene glycol | 25 | 3.0 |
| Polyelectrolyte Dispersing agent (DARVAN No. 7) | 12 | 1.2 |
| Magnesium Silicate Talc (NYTAL 300) | 242-X | 10.2 |
| Organic nonsilicon Defoamer (Balab 748) | 4 | 0.4 |
| Titanium dioxide (Zopaque R-55S) | 200 | 5.8 |
| Mold inhibitor | X | |
| Slow Speed Reduction | | |
| Ammonium hydroxide | 4 | 0.4 |
| Acrylic latex (Rhoplex AC-388) | 450 | 51.0 |
| | 1170 | 100.0 |

*See Table I

A mold inhibitor of this invention and, for comparison, commercial mercury-type mold inhibitors were added to the basic formulation, together with the pigment to allow for good distribution in the paint. The mold inhibitor, identified by an X, was added in the amount indicated in Table I and was substituted for an equal volume of pigment in the formula when in powder form and for an equal volume of solvent when in liquid form.

One coat of Federal Specification TT-P-25c primer was applied to ¾ inch × 6 inches pieces of hardwood and allowed to dry. Two brush coats of each test paint was applied to the panel and allowed to dry. The wood pieces were then attached to a rack and exposed outside in Louisiana under severe mildew conditions for one year. After exposure, the wood piece test samples were rated on the following scale:

10 = no mildew growth
8 = slight growth
6 = considerable growth
4 = heavy growth
2 = very heavy growth
0 = extreme growth The test results are compiled in Table I.

EXAMPLE II

Exterior linseed oil paint was prepared by blending together the following ingredients in amounts indicated and subjected to outdoor exposure tests as described in Example I.

| Linseed Oil-Based Paint Formula | | |
|---|---|---|
| | Pounds | Gallons |
| Titanium dioxide (Zopaque SD) | 100 | 3.1 |
| Titanium dioxide (Zopaque R-88) | 100 | 2.9 |
| Zinc oxide (AZO-33) | 100 | 2.1 |
| Magnesium Silicate Talc (NYTAL 300) | 440-X* | 18.5 |
| Linseed oil (Alinco X) | 100 | 12.5 |
| Raw linseed oil | 340 | 43.8 |
| Lead Tallate (24%) | 12 | 1.2 |
| Manganese tallate (6%) | 2 | 0.3 |

| Linseed Oil-Based Paint Formula -continued | | |
|---|---|---|
| | Pounds | Gallons |
| Butyraldoxime Anti-Skin agent (Exkin No. 1) | 2 | 0.2 |
| Mineral spirits | 101-X | 15.4 |
| Mold inhibitor | X | |
| | 1297 | 100.0 |

*See Table I

The test results are compiled in Table I.

EXAMPLE III

Exterior alkyd paint was prepared by mixing together the following ingredients in the amounts indicated and subjected to outdoor exposure tests as described in Example I.

| Alkyd Paint Formulation | | |
|---|---|---|
| | Pounds | Gallons |
| Titanium dioxide (Zopaque R-88S) | 300 | 8.6 |
| Magnesium Silicate Talc (NYTAL 300) | 350-X* | 14.7 |
| Modified bentonite thickener (Bentone 34) | 6 | 0.4 |
| Mineral spirits | 42 | 6.4 |
| Ethyl alcohol | 2 | 0.3 |
| Alkyd (Aroplaz 1271) | 350 | 42.0 |
| Lead naphthenate 24% | 6 | 0.6 |
| Manganese naphthenate 6% | 1 | 0.1 |
| Butyraldoxime Anti-Skin agent (Exkin No. 1) | 2 | 0.2 |
| Polymerized alkyl phosphate type flow agent (RHEOTOL) | 6 | 0.8 |
| Mineral spirits | 170-X | 25.9 |
| Mold inhibitor | X | |
| | 1235 | 100.0 |

*See Table I

Mildew growth was evaluated as in Example I. The results are compiled in Table I.

EXAMPLE IV

Exterior polyvinyl acetate (PVA) paint was prepared according to the following formulation and subjected to outdoor exposure tests as described in Example I.

| Polyvinyl Acetate Paint Formulation | | |
|---|---|---|
| High Speed Dispersion | Pounds | Gallons |
| Carboxymethylcellulose (Manufactured by Hercules) 2% gel | 122 | 14.7 |
| Water | 124-X* | 14.9 |
| Ethylene glycol | 25 | 3.0 |
| Polyelectrolyte dispersing agent (DARVAN No. 7) | 10 | 1.0 |
| Organic nonsilicon defoamer (Balab 917) | 4 | 0.4 |
| Titanium dioxide (Zopaque SD) | 10 | 0.3 |
| Titanium dioxide (Zopaque R-88) | 190 | 5.5 |
| Magnesium Silicate Talc (NYTAL 300) | 220-X | 10.2 |
| Mold inhibitor | X | |
| Slow Speed Reduction | | |
| Polyvinyl acetate (Everflex BG) | 445 | 50.0 |
| | 1150 | 100.0 |

*See Table I

The extent of mildew growth is shown in Table I.

For comparison as commercial controls, phenylmercury oleate was used in organic solvent-thinned paints while phenylmercury dodecenylsuccinate was used in latex paints as indicated in Table I.

EXAMPLE V

Exterior acrylic latex paint was prepared by a microtechnique according to the formula given below. Each mold inhibitor was evaluated in the paint at a level of 2.0% based on the total paint weight. Liquids were added directly to the finished paint whereas solids were mulled into propylene glycol and incorporated into the finished paint. In some instances, it was necessary to dissolve solid compounds in a suitable solvent because coarseness prevented preparing a concentrated dispersion.

| Exterior Acrylic Latex Paint Formula | | |
|---|---|---|
| High Speed Dispersion | Pounds | Gallons |
| Hydroxyethylcellulose (2.5% Cellosize QP-15000 Gel) | 85.0 | 10.4 |
| Water | 62.5 | 7.5 |
| Polyelectrolyte dispersing agent (DARVAN No. 7) | 10.5 | 1.1 |
| wetting agent of the alkyl aryl ether type (Triton CF-10) | 2.5 | 0.3 |
| Potassium tripolyphosphate | 1.5 | 0.1 |
| Defoamer (Nopco NXZ) | 1.0 | 0.1 |
| Ethylene glycol | 25.0 | 2.7 |
| Rutile titanium dioxide | 250.0 | 7.5 |
| Magnesium Silicate Talc (NYTAL 300) | 210.0 | 8.8 |
| Slow Speed Reduction | | |
| Acrylic latex (Rhoplex AC-388) | 460.0 | 52.2 |
| Defoamer (Nopco NXZ) | 1.0 | 0.1 |
| Tributyl phosphate | 11.0 | 1.4 |
| Propylene glycol | 34.0 | 4.0 |
| Ammonium hydroxide | 1.0 | 0.1 |
| Water | 31.0 | 3.7 |
| | 1186.0 | 100.0 |

The test paints were allowed to age for one week before preparation of exposure panels. The panels were prepared by applying two brush coats of each test paint to tongue depressor panels (¾ inch × 6 inches) previously primed with one coat of a primer based on Federal Specification TT-P-25d (no mold inhibitor). One or two days were allowed before applying the second coat of test paint.

The panels were mounted vertically on wood frames and exposed outdoors facing south in Louisiana.

After about 6 months' exposure, the test samples were rated on the scale of Example I. The results are compiled in Table II.

TABLE II

Results of Outdoor Exposure

| Mold inhibitor | Percent based on paint weight | Mold growth after six months |
|---|---|---|
| none | — | 3 |
| VANCIDE 51Z (control) | 1.0 | 7 |
| VANCIDE 51Z (control) | 2.0 | 8 |
| 1-methoxyl-1-methyl-3-(4-bromo-3-chlorophenyl)urea | 2.0 | 6 |
| 1-(3-piperidinopropyl)-3-(2,3-dichlorophenyl)urea | 2.0 | 7 |
| 1-(3-dibutylaminopropyl)-3-(2,5-dichlorophenyl)urea | 2.0 | 6 |
| 1-(3-piperidinopropyl)-3-(3,4-dichlorophenyl)urea | 2.0 | 7 |
| 1,1-dimethyl-3-(3,5-dichlorophenyl)urea | 2.0 | 8 |

The results in Table I establish superiority of the mold inhibitors of this invention as compared with the commercial controls, and the results of Table II establish adequacy of the mold inhibitors of this invention as compared with the highly effective Vancide inhibitors serving as controls.

When comparing the results of Table I to the results of Table II, it should be recognized that only the results of Example I of Table I are of the inhibiting effect of the compounds of the invention in acrylic latex paint as used in Example V and thus to only the results of Example I are truly comparable to the results of Example V. It should also be recognized that all the results in Table II were from samples facing south. Some variation in the results of Table I and Table II can also ascribed to differing weather conditions and to the different exposure times.

1,1-dimethyl-3-phenylurea was also tested. It was found to have some mold inhibiting effect, but not sufficient to be considered adequate as compared with the controls.

The urea compounds listed in Table III were tested under the same conditions used in Example V and found to have either inadequate mold inhibiting properties, that is, a rating from 0–4, on the scale of Example I and/or were found to have adverse effects in the paint such as gelling, coagulating, or discoloring.

TABLE III 1-(3-dimethylaminopropyl)-3-(2-fluorophenyl)urea
1,1-dimethyl-3-(4-chloro-3-nitrophenyl)urea
1,1-dimethyl-3-(4-methyl-2-nitrophenyl)urea
1-(3-dimethylaminopropyl)-3-(3,4-dichlorophenyl)urea
1-methoxy-1-methyl-3-(3,4-dichlorophenyl)urea

TABLE I

Results of Outdoor Exposure

| | | Mold Growth Rating After One Year Exposure | | | | | | | |
|---|---|---|---|---|---|---|---|---|---|
| | X Pounds of Inhibitor per 100 Paint | I Acrylic | | II Linseed Oil | | III Alkyd | | IV PVA | |
| Mold Inhibitor | | $N^1$ | $S^2$ | N | S | N | S | N | S |
| None | None | 3 | 3 | 2 | 2 | 2 | 2 | 1 | 1 |
| 1,1-dimethyl-3-(3,4-dichlorophenyl)urea | 24 | 4.5 | 6 | 3 | 4 | 3 | 3 | 3.5 | 5 |
| Phenylmercury oleate | 37 | — | — | 2.5 | 2 | 3 | 2 | — | — |
| Phenylmercury dodecenylsuccinate | 36 | 4 | 2 | — | — | — | — | 3 | 3 |

[1]North.
[2]South.

1,1-dimethyl-3-p-chlorophenylurea
1,1-dimethyl-3-p-chlorophenoxyphenylurea
1,1-dimethyl-3-(ααα-trifluoro-m-tolyl)urea
1-methyl-1-methoxy-3-p-bromophenylurea
1,1-dimethyl-3-(3-chloro-2-methylphenyl)urea
1-(3-diethylaminopropyl)-3-(2-fluorophenyl)urea
1,1-dimethyl-3-(3-trifluoromethylphenyl)urea
1-(3-dimethylaminopropyl)-3-(3-trifluoromethylphenyl)urea
1-(3-diethylaminopropyl)-3-(3-trifluoromethylphenyl)urea
1-(3-dimethylaminopropyl)-3-(2,3-dichlorophenyl)urea
1-(3-diethylaminopropyl)-3-(2,3-dichlorophenyl)urea
1-(3-dimethylaminopropyl)-3-(4-methyl-2-nitrophenyl)urea
1,1-dimethyl-3-(4-methyl-3-nitrophenyl)urea
1-(3-diethylaminopropyl)-3-(4-methyl-3-nitrophenyl)urea
1-(3-dimethylaminopropyl-3-(4-chloro-3-nitrophenyl)urea
1-(3-diethylaminopropyl)-3-(4-chloro-3-nitrophenyl)urea
1-(3-diethylaminopropyl)-3-(3,4-dichlorophenyl)urea
1,1-dimethyl-3-(4-chloro-2-methylphenyl)urea
1-(3-dimethylaminopropyl)-3-(4-chloro-2-methylphenyl)urea
1-(3-dimethylaminopropyl)-3-(2,5-dichlorophenyl)urea
1-(3-diethylaminopropyl)-3-(2,5-dichlorophenyl)urea
1-(3-dibutylaminopropyl)-3-(2,3-dichlorophenyl)urea
1-(3-piperidinopropyl)-3-(2,5-dichlorophenyl)urea
1-(3-dimethylaminopropyl)-3-(3,5-dichlorophenyl)urea
1-(3-dibutylaminopropyl)-3-(3,4-dichlorophenyl)urea
1-butyl-1-methyl-3-(3,4-dichlorophenyl)urea The test results illustrate the protection against mildew fungi obtained with the compounds of this invention as compared with the non-Mercury type Vancide 51-Z control and their superiority as compared with commercial mercury type mold inhibitors, thus demonstrating the utility of the invention.

I claim:

1. An improved surface coating composition comprising a binder normally subject to microbial attack selected from the group consisting of oleoresinous binders, synthetic linear addition polymer binders or combinations of the two, and a biologically active compound of the formula:

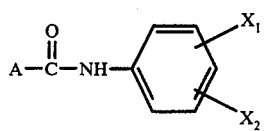

wherein $X_1$ and $X_2$ respectively represent halogens having an atomic number from 9 to 35 and A is an amino radical selected from the group, consisting of dialkylamino having 1 to 3 carbon atoms in each alkyl group; (3-dibutylaminopropyl) amino when $X_1$ and $X_2$ are in the 2,5 position; (3-piperidinopropyl)amino when $X_1$ and $X_2$ are in the 2,3 or 3,4 position and methylmethoxyamino when at least one of $X_1$ and $X_2$ is bromine, said biologically active compound being in sufficient amount to inhibit the growth of microorganisms on the dry film formed from said surface coating composition.

2. An improved surface coating composition, claimed in claim 1, in the form of a paint suitable for application to a surface to form a dried coating, wherein the surface coating is a water-thinned (latex) paint.

3. An improved surface coating composition, claimed in claim 1, in the form of a paint suitable for application to a surface to form a dried coating, wherein the amount of said biologically active compound is 0.1 to 5 percent by weight of the paint.

4. An improved surface coating composition as claimed in claim 1, wherein the biologically active compound is a 1,1-dimethyl-3-(dichlorophenyl)urea.

5. An improved surface coating as in claim 1 wherein the biologically active compound is a 1,1-dimethyl-3-(dichlorophenyl)urea selected from the group consisting of 1,1-dimethyl-3-(3,4-dichlorophenyl)urea and 1,1-dimethyl-3-(3,5-dichlorophenyl)urea.

6. An improved surface coating as in claim 1 wherein the biologically active compound is 1-(3-piperidinopropyl)-3-(2,3-dichlorophenyl)urea.

7. An improved surface coating as in claim 1 wherein the biologically active compound is 1-(3-dibutylaminopropyl)-3-(2,5-dichlorophenyl)urea.

8. An improved surface coating as in claim 1 wherein the biologically active compound is 1-(3-piperidinopropyl)-3-(3,4-dichlorophenyl)urea.

9. A dry film formed upon drying a surface coating composition comprising a binder normally subject to microbial attack selected from the group consisting of oleoresinous binders, synthetic linear addition polymer binders or combinations of the two, and a biologically active compound of the formula:

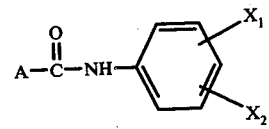

wherein $X_1$ and $X_2$ respectively represent halogens having an atomic number from 9 to 35 and A is an amino radical selected from the group, consisting of dialkylamino having 1 to 3 carbon atoms in each alkyl group; (3-dibutylaminopropyl) amino when $X_1$ and $X_2$ are in the 2,5 position; (3-piperidinopropyl)amino when $X_1$ and $X_2$ are in the 2,3 or 3,4 position and methylmethoxyamino when at least one of $X_1$ and $X_2$ is bromine.

10. A dry film as claimed in claim 9 wherein the amount of said biologically active compound is from 0.1 to 10 percent by weight of the film.

11. A method of inhibiting, for extended periods of time, microbial attack of dry surface coatings formed by coating compositions oleoresinous containing binders selected from the group consisting of oleresinous binders, synthetic linear addition polymer binders or combinations of the two, such as paint and the like, comprising incorporating in the composition an antimicrobially effective amount of a biologically active compound of the formula:

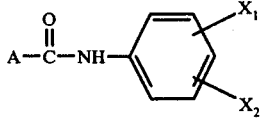

wherein $X_1$ and $X_2$ respectively represent halogens having an atomic number from 9 to 35 and A is an amino radical selected from the group, consisting of dialkylamino having 1 to 3 carbon atoms in each alkyl group; (3-dibutylaminopropyl)amino when $X_1$ and $X_2$ are in the 2,5 position; (3-piperidinopropyl)amino when $X_1$ and $X_2$ are in the 2,3 or 3,4 position and methylmethoxyamino when at least one of $X_1$ and $X_2$ is bromine.

12. A method as claimed in claim 11, wherein the biologically active compound is a 1,1-dimethyl-3-(dichlorophenyl)urea.

13. A method as claimed in claim 11, wherein the biologically active compound is a 1,1-dimethyl-3-(dichlorophenyl)urea selected from the group consisting of 1,1-dimethyl-3-(3,4-dichlorophenyl)urea and 1,1-dimethyl-3-(3,5-dichlorophenyl)urea.

* * * * *